Dec. 25, 1962     W. P. LEAR, SR     3,070,336
AIRCRAFT WHEEL ALIGNMENT CONTROL SYSTEM

Filed July 25, 1960     2 Sheets-Sheet 1

INVENTOR.
WILLIAM P. LEAR SR.
BY Ernest L Brown
ATTORNEY 3,070,336
AIRCRAFT WHEEL ALIGNMENT
CONTROL SYSTEM
William P. Lear, Sr., Le Ranche, Onex, Switzerland, assignor, by mesne assignments, to Lear Siegler, Inc., Santa Monica, Calif., a corporation of Delaware
Filed July 25, 1960, Ser. No. 45,204
8 Claims. (Cl. 244—103)

This invention pertains to means for positioning the wheels of an aircraft relative to the airframe of said aircraft to cause said wheels to be aligned with the direction of the runway. More particularly, the device of this invention is a means for slaving the axis of rotation of the wheels of an aircraft to a direction perpendicular to the heading of a runway.

When there is a significant component of a cross wind on an approach to a runway, an aircraft which is making a landing approach must turn into the wind. When the aircraft is turned into the wind, the heading of the aircraft and the runway do not coincide, but differ by an angle, called the crab angle of the aircraft.

If the wheels of the aircraft are not aligned with the runway when an aircraft lands, a significant stress is placed upon the landing gear which may cause it to buckle or otherwise fail, or may cause the tires to explode.

To align the wheels with the runway, an aircraft with a fixed landing gear must turn to the runway heading and thus align the wheels just before touchdown. This is a difficult and sometimes dangerous maneuver which complicates the problem of automatically landing an aircraft.

The problem has been partially solved on certain large aircraft by providing means to preset the position of the landing gear to the known crab angle. However, small wind shifts can occur or changes in speed may be necessary, so that last minute corrections are required. Hence, the attention of the pilot at the criical time of the landing has been required and the pilot has been distracted from operating other, perhaps more important, devices.

This invention contemplates slaving the axis of rotation of the wheels to a direction perpendicular to the heading of the runway by continuously and automatically comparing the known heading of the runway and the measured heading of the supporting aircraft. Instead of manually trimming the system in accordance with the computed or estimated crab angle of the aircraft, only one setting, namely the known heading of the runway, needs to be inserted in the control system of this invention.

It is contemplated that the known heading may be inserted manually or in response to an automatic, programmed flight plan or in response to a signal from a ground control center.

It is therefore an object of this invention to align the wheels of an aircraft in a predetermined direction.

It is another object of this invention to align the wheels of an aircraft to the known heading of the runway.

It is also an object of this invention to align the axis of rotation of the wheels of an aircraft perpendicular to a predetermined direction.

It is yet another object of this invention to align the axis of rotation of the wheels of an aircraft perpendicular to a known heading of a runway.

It is a more particular object of this invention to control the position of the axis of rotation of the wheels of an aircraft about an axis substantially parallel to the azimuth axis of said aircraft in accordance with the difference between the known heading of the runway and the measured heading of the supporting aircraft.

Other objects will become more apparent from the following description taken in connection with the accompanying drawings in which.

Figure 1:
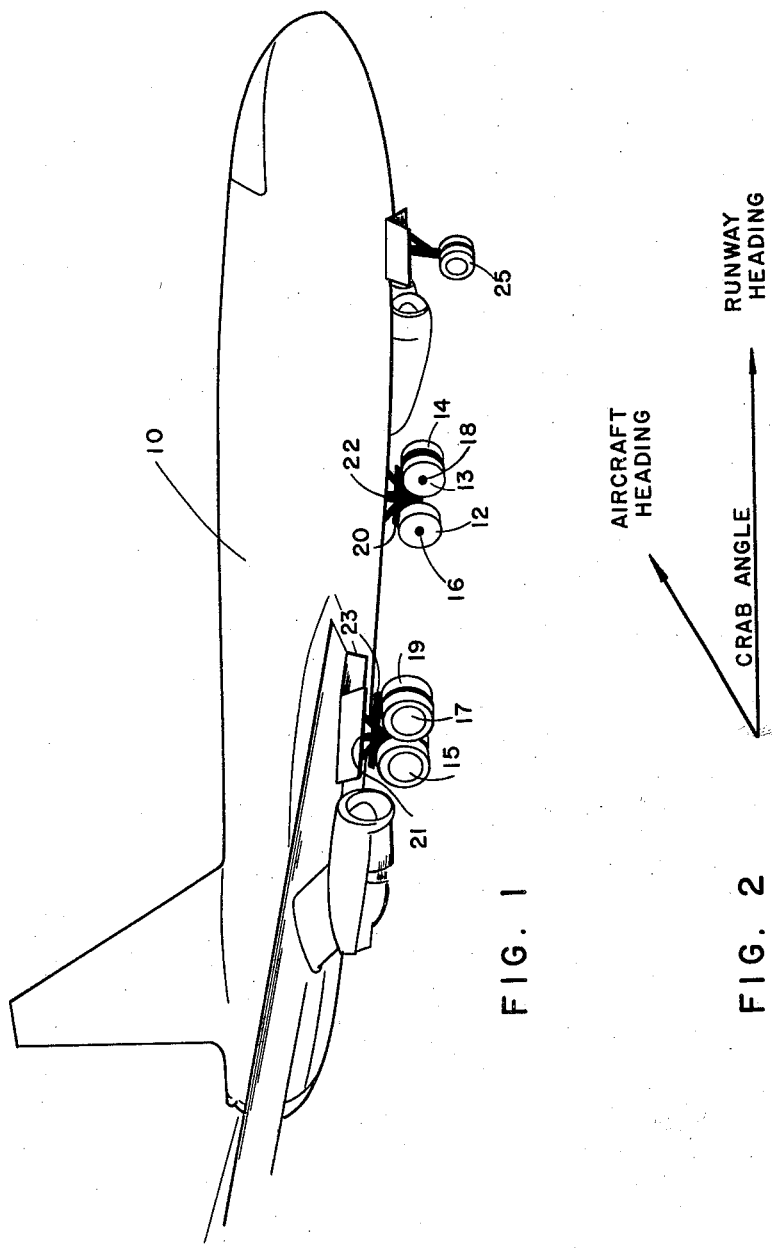
FIGURE 1 is a fanciful picture of an aircraft which has wheels adapted to have their axis of rotation positioned relative to the airframe about an axis which is substantially parallel to the azimuth axis of the aircraft.

In FIGURE 1, aircraft 10 has a plurality of wheels, some of which are marked 12, 13, 14, 15, 17, 19 and 25. Wheels 12, 13, 14 and another wheel (not shown) are mounted for rotation about axes 16 and 18 relative to truck or frame 20. Truck 20 is adapted to rotate about shaft 22 (whose axis is substantially parallel to the azimuth axis of aircraft 10) relative to aircraft 10. Similarly wheels 15, 17, 19 and another wheel (not shown) are mounted for rotation relative to truck 23. Truck 23 is adapted to rotate about shaft 21 (whose axis is substantially parallel to the azimuth axis of aircraft 10) relative to aircraft 10. Nose wheel 25 may also be adaped to have its spin axis rotate parallel to the azimuth axis of aircraft 10.

In FIGURE 1 the wheels are shown in their extended position preparatory to the landing of aircraft 10. Of course, it is to be understood that the wheels of FIGURE 1 are by way of example only, and that the detailed structure of typical landing wheels are well known in the art. It is further to be understood that a truck or frame 20 or 23 is not necessary but that the axis of rotation of the individual wheels may, alterantively be rotated about an axis which is substantially parallel to the azimuth of aircraft 10.

Figure 2:
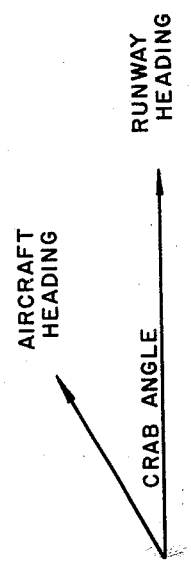
FIGURE 2 is a diagram which shows the direction of the runway heading relative to the aircraft heading.

Self-explanatory FIGURE 2 shows the relation between the aircraft heading and the runway heading when the aircraft approaches a runway which has a cross-wind component.

Figure 3:
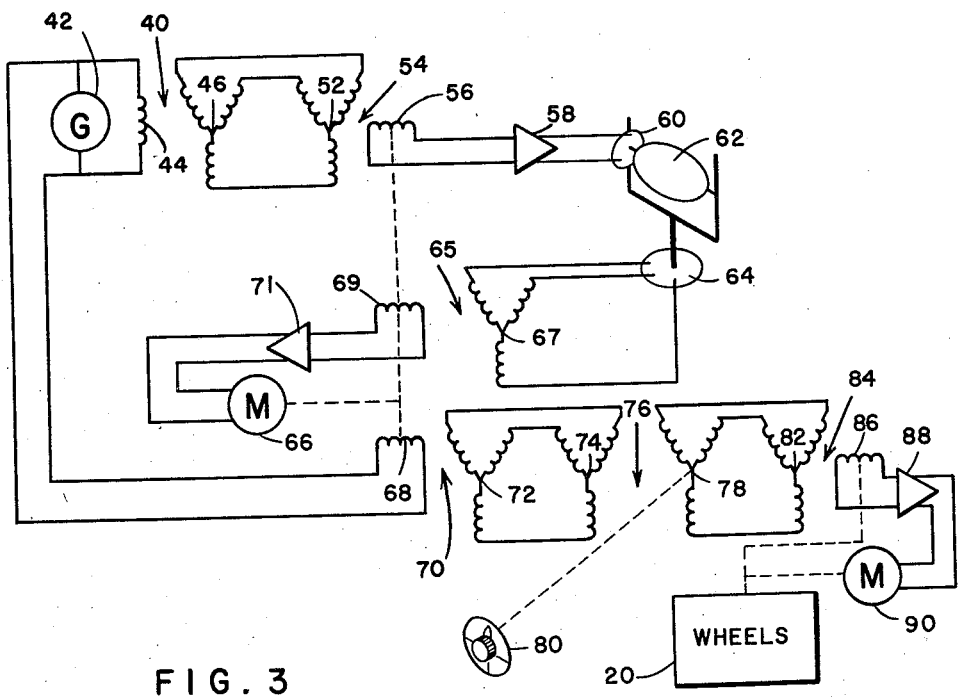
FIGURE 3 is a schematic diagram of a typical embodiment of the device of this invention.

In FIGURE 3, flux valve 40 is energized by alternator 42 which is connected to the primary winding 44 of flux valve 40. The secondary winding 46 of flux valve 40 is connected to the stator winding 52 of synchro control transformer 54. Rotor winding 56 of transformer 54 is connected through amplifier 58 to torquing means 60 of directional gyroscope 62. A synchro control transmitter 64 is connected to generate a signal which is a measure of the azimuth angle of the spin axis of gyroscope 62. The stator of transmitter 64 is electrically connected to the stator 67 of synchro control transformer 65. The rotor 69 of transformer 65 is electrically connected, through amplifier 71, to motor 66. Motor 66 drives rotor 69 to a stable null-signal position. The position of the shaft of motor 66 is a measure of the heading of the supporting aircraft 10. Motor 66 also drives rotor 56 of transformer 54 and rotor 68 of synchro control transmitter 70. Rotor 68 is connected to receive electrical energy from alternator 42. Stator winding 72 of transmitter 70 is electrically connected to stator winding 74 of differential synchro 76. The rotor 78 of synchro 76 is mechanically connected to be controlled by means of a shaft with a knob and dial 80 which is calibrated to the points of the compass. Rotor 78 is electrically connected to stator 82 of synchro control transformer 84. Rotor 86 of transformer 84 is electrically connected, through amplifier 88, to motor 90. Motor 90 is mechanically connected to drive rotor 86 to a stable null-signal position. Motor 90 also positions wheels 20 about an axis substantially parallel to the azimuth axis of aircraft 10 to align the axis of rotation of wheels 20 perpendicular to the heading which is set on dial 80.

Operation of the device may best be described by describing the actions of the pilot as the aircraft approaches the runway. After the wheels are down, the system of this invention is energized. The heading of the runway is manually set into the shaft of knob and compass dial 80. The position of knob 80 could conveniently be controlled from the ground or be controlled by a programmed computer. Means for automatically controlling knob 80 are neither shown nor described in this specification.

Flux valve 40 is energized by alternator 42 which passes current through primary winding 44. The alternator 42 may be actuated in any of the conventional means such as direct mechanical connection to the aircraft's engines or driven by an air stream directed on blades mechanically connected to the input of the alternator. The signal on stator winding 44 is applied to the winding 46. The signal of stator winding 46 is applied to stator winding 52. When rotor winding 56 is aligned to a null-signal position no signal is generated in rotor 56. When, however, rotor 56 is not aligned to a null-signal position a signal is generated in rotor 56 which is applied, through amplifier 58, to torquing means 60 of gyroscope 62 to cause gyroscope 62 to precess about its azimuth axis. Synchro control transmitter 64 generates a signal which is a measure of the heading of the spin axis of directional gyroscope 62 about its azimuth axis with respect to north. The signal generated by synchro control transmitter 64 is delivered to stator winding 67. When rotor winding 69 has a position which corresponds to the azimuth angle of directional gyroscope 62, no signal is delivered to motor 66. When, however, the position of rotor 69 is not a measure of the azimuth of the spin axis of gyroscope 62, a signal is transferred from rotor 69 through amplifier 71 to drive motor 66. Motor 66 mechanically drives rotor 69 to a stable position wherein no signal appears upon rotor 69. The position of the shaft of motor 66 is then a measure of the heading of aircraft 10. The mechanical position of rotor 56 repeats the position of shaft of motor 66, and is thus aligned with the magnetic north.

Rotor 68 is mechanically positioned by motor 66 to a position which is a measure of the heading of aircraft 10. Rotor 68 is energized by alternator 42 to induce a voltage which is a measure of the heading of aircraft 10 into stator winding 72. The signal on stator winding 72 is transferred to stator winding 74. The heading set on the dial 80 is the heading of the landing runway. When the heading of aircraft 10 is aligned with the reading of the dial of knob 80, no signal is induced into rotor 78. When, however, the reading of the dial of knob 80 differs from the heading of aircraft 10, a signal which is a measure of the difference between the runway heading and the heading of aircraft 10 is induced in rotor 78. The signal which appears at the terminals of rotor 78 is transferred to stator 82. When wheels 20 are aligned with their spin axis perpendicular to the heading which is read on the dial of knob 80 no signal is induced into rotor 86. When, however, wheels 20 are not aligned with their axis of rotation normal to the heading which is read on the dial of knob 80, a signal is induced into rotor 86 which is applied, through amplifier 88, to motor 90. Motor 90 drives rotor 86 to a stable null-signal position and also drives wheels 20 to position their axis of rotation perpendicular to the heading which is read on the dial of knob 80.

Thus the device of this invention slaves the heading of the axes of rotation of the landing wheels of an aircraft to a direction perpendicular to the heading of its landing runway. Gusts of wind and changes in velocity which disturb the crab angle of the aircraft do not disturb the heading of the wheels. Further, the crab angle of the aircraft need not be measured or estimated by the pilot. The pilot need not continuously control the position of wheels during landing maneuvers when his attention should be directed to other matters.

Although the device of this invention has been particularly described and particularly shown herein, it is to be stressed that the invention is not to be limited to this description but only in accordance with the spirit and scope of the appended claims. For example, although an electrical servo system is shown and described herein to position the wheels, it is to be understood that other equivalent control means which are known in the art, such as (for example) pneumatic and hydraulic servo systems could be utilized to position the wheels. It is further to be stressed that the invention is not limited to the particular control circuitry which is shown and described herein but rather that it is intended that equivalent circuit structure which is adapted to compare the heading of an aircraft with the known heading of the runway by utilizing compass means, or the like, are intended to be covered by this invention.

Having thus described my invention, I claim:

1. In combination: an aircraft having wheels attached thereto, the spin axes of said wheels being adapted to be oriented about an axis substantially parallel to the azimuth axis of said aircraft; servo means connected between said aircraft and said wheels to position said wheels through a predetermined angle about said azimuth axis, means for generating a signal which is a measure of the heading of said aircraft; angle comparison means adapted to be preset in accordance with a predetermined heading and connected to said first mentioned signal generating means to generate a second signal which is a measure of the difference between said predetermined heading and the heading of said aircraft; the output of said comparison means being connected to control said servo means to cause the spin axes of said wheels to be aligned about said azimuth axis perpendicular to said predetermined heading.

2. In an aircraft having wheels whose axes of rotation are adapted to be rotated about a first axis substantially parallel to the azimuth axis of said aircraft: servo means connected between said aircraft and said wheels to rotate the axis of rotation of said wheels about said first axis; first electrical means for generating an electrical signal which is a measure of the heading of said aircraft; a shaft, means for rotating said shaft such that the position of said shaft is a measure of the desired heading of said wheels; means connected to said first electrical means and to said shaft and having an electrical output which is a function of said electrical signal from said first electrical means and the position of said shaft, said electrical output being a measure of the crab angle of said aircraft; said electrical output being connected to control said servo means.

3. A device as recited in claim 2 wherein said means connected to said first electrical means and to said shaft is a synchro.

4. A device as recited in claim 3 wherein said servo means is a synchro, an amplifier electrically connected to the rotor of said synchro, a motor connected to be driven by said amplifier, the shaft of said motor being connected to position the axes of said wheels about said first axis and to rotate the rotor of said synchro to a stable null position.

5. A device as recited in claim 2 wherein said means for generating a signal which is a measure of the heading of said aircraft comprises a flux valve, means to energize said flux valve, a first synchro connected by its stator to the output of said flux valve, a first amplifier connected by its input to the rotor of said first synchro, a directional gyroscope having a torquer on its leveling axis and a synchro on its azimuth axis, said torquer connected to be driven by the output of said first amplifier, a third synchro connected by its stator to receive a signal from said synchro on said azimuth axis, a second amplifier connected by its input to the rotor of said third synchro, a first motor connected to be driven by said second amplifier, and having its shaft connected to drive the rotors of said first and third synchros, a fourth synchro having its rotor connected to be driven by said first motor to generate a signal in its stator winding which is a measure of the heading of said aircraft.

6. A device as recited in claim 5 wherein said means connected to said first electrical means and to said shaft is a fifth synchro.

7. A device as recited in claim 6 wherein said servo means comprises a sixth synchro having its stator winding connected to the output of said fifth synchro, a third amplifier connected by its input to the rotor of said sixth synchro, a second motor connected by its input to the output of said third amplifier and having its shaft connected to drive the rotor of said sixth synchro to a stable null position and connected to position said wheels about said first axis.

8. Aircraft wheel alignment apparatus for an aircraft having wheels attached thereto, comprising:
 means to orient the spin axes of said wheels about an axis substantially parallel to the azimuth axis of said aircraft,
 servo means connected between said aircraft and said wheels to position said wheels through a predetermined angle about said azimuth axis,
 means for generating a signal which is a measure of the heading of said aircraft;
 angle comparison means adapted to be preset in accordance with a predetermined heading and connected to said first mentioned signal generating means to generate a second signal which is a measure of the difference between said predetermined heading and the heading of said aircraft; the output of said comparison means being connected to control said servo means to cause the spin axes of said wheels to be aligned about said aximuth axis perpendicular to said predetermined heading.

References Cited in the file of this patent
UNITED STATES PATENTS

| | | |
|---|---|---|
| 1,786,649 | Gonzalez | Dec. 30, 1930 |
| 1,844,186 | Short | Feb. 9, 1932 |
| 2,474,630 | Jamison | June 28, 1949 |
| 2,676,770 | Schuck | Apr. 27, 1954 |
| 2,834,564 | Perkins et al. | May 13, 1958 |